United States Patent
Kozdon et al.

(10) Patent No.: US 6,456,618 B2
(45) Date of Patent: Sep. 24, 2002

(54) METHOD AND APPARATUS FOR DTMF SIGNALING ON COMPRESSED VOICE NETWORKS

(75) Inventors: Peter Kozdon, Santa Clara; Eli Jacobi; Shmuel Shaffer, both of Palo Alto; William J. Beyda, Cupertino, all of CA (US); Leroy E. Gilbert, Wellington, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/734,790

(22) Filed: Dec. 11, 2000

Related U.S. Application Data (63) Continuation of application No. 09/047,301, filed on Mar. 24, 1998.

(51) Int. Cl.[7] .......................... H04L 12/66; H04L 12/56
(52) U.S. Cl. .................... 370/352; 370/356; 379/88.17; 379/283; 379/900
(58) Field of Search ............................... 370/352–356, 370/400, 401, 409, 498, 521, 525, 526; 379/88.17, 283, 339, 900

(56) References Cited

U.S. PATENT DOCUMENTS

| | | |
|---|---|---|
| 5,633,862 A | 5/1997 | Susuki et al. |
| 5,666,357 A | 9/1997 | Jangi |
| 5,761,280 A * | 6/1998 | Noonen et al. .......... 379/93.27 |
| 5,889,774 A | 3/1999 | Mirashrafi et al. |
| 5,940,479 A | 8/1999 | Guy et al. |
| 6,006,108 A * | 12/1999 | Black et al. ................. 455/553 |
| 6,169,734 B1 * | 1/2001 | Wilson ........................ 370/352 |
| 6,310,873 B1 * | 10/2001 | Rainis et al. ............... 370/352 |
| 6,320,951 B1 * | 11/2001 | Shtivelman et al. ... 379/211.01 |

FOREIGN PATENT DOCUMENTS

JP 11055396 A * 2/1999

* cited by examiner

Primary Examiner—Hassan Kizou
Assistant Examiner—Ahmed Elallam (57) ABSTRACT

A method of transmitting DTMF signals over a compressed computer network (24) comprises sending a packet containing a compressed DTMF signal followed by a confirmation packet. The confirmation packet preferably comprises an uncompressed DTMF signal which is transmitted on the same logical channel as the packets that represent voice signals. To detect the DTMF signal transmitted, a telephony Internet server (28) decompresses packets as they are received. If a packet appears to contain a compressed DTMF signal, the telephony Internet server looks for the presence of the confirmation packet before processing the previously received packet as a DTMF signal. In an alternative embodiment, the confirmation packet comprises a code that represents a DTMF signal. The packets that represent the voice signal and the code representing the DTMF signal are sent on separate virtual channels of the same logical channel. At a receiving end, data on one channel is directed by a separation logic block (114) to a speech decompressor (116) while another channel is directed to a DTMF signal generator (118) that generates a DTMF signal when a corresponding code is detected. The outputs of either the speech decompressor or the DTMF signal generator are applied to a receiving telephone (124).

5 Claims, 6 Drawing Sheets

METHOD AND APPARATUS FOR DTMF SIGNALING ON COMPRESSED VOICE NETWORKS

CROSS-REFERENCE TO RELATED APPLICATIONS

This is a continuation of U.S. application Ser. No. 09/047,301, filed Mar. 24, 1998, which application is incorporated herein by reference for all purposes.

FIELD OF THE INVENTION

The present invention relates to communication systems in general, and in particular to communication systems that transmit telephone signals over compressed computer networks.

BACKGROUND OF THE INVENTION

As an alternative to placing all telephone calls through the public switched telephone network, many companies are utilizing the excess capacity in their computer networks to carry a portion of their telephone calls. This is advantageous because the company does not have to pay for each telephone call individually. However, because such networks were not specifically designed for telecommunication, there are some inherent problems that occur when transmitting telephone signals over such networks.

One common problem with telephone calls that are routed over computer networks occurs when a call is placed to a system or device that detects and responds to dual tone multi-frequency (DTMF) signals commonly referred to as Touch-tone™ signals. Such systems may include voice mail systems that allow users to store and retrieve messages or voice recognition units (also called integrated voice response units) that are programmed to retrieve information after entering one or more Touch-tone signals on a telephone keypad. One example of a voice recognition unit is an automatic banking response system of the type commonly provided by banks to allow users to access their accounts over the telephone.

When telephone signals are transmitted over a computer network, such as a local area network (LAN) or wide area network like the Internet, the telephone voice signals, as well as the DTMF signals are digitized, organized into a number of data packets, and compressed prior to transmission. Upon receipt, these data packets are decompressed and analyzed to reconstruct the original telephone signals. When a DTMF signal is compressed, transmitted over the computer network, and decompressed, the result is no longer a set of pure sinusoidal tones having predefined frequencies. Instead, the tones become distorted and can therefore be difficult to detect with a digital signal processor. As such, many communication systems do not support sending DTMF signals over compressed computer networks. Alternatively, systems are required to store the telephone number of the voice mail or integrated voice response systems that can be accessed within a network. All calls to these systems are routed over uncompressed networks. The complexities of routing a call on either an uncompressed or compressed network, depending on the destination, is generally inefficient.

Given the shortcomings in the prior art, there is a need for a method of reliably sending DTMF signals over compressed computer networks that does not require the use of additional channels or monitoring the destination called.

SUMMARY OF THE INVENTION

The present invention is a method of transmitting DTMF signals over a computer network. A received telephone signal is digitized, divided into a series of packets, and compressed using a conventional compression algorithm. The compressed packets are then transmitted on a data network. As the telephone signal is being digitized and divided into packets, it is continually analyzed to detect the presence of a DTMF signal. Upon the detection of a DTMF signal, an additional confirmation packet is inserted into the stream of packets and transmitted after the compressed packet that represents the DTMF signal. According to one embodiment of the invention, the confirmation packet comprises the uncompressed DTMF signal.

At a receiving end, packets are decompressed and analyzed to determine if they may represent a DTMF signal. If it appears that a packet containing a compressed version of a DTMF signal has been received, a receiving station looks for the confirmation packet. If the confirmation packet is present, the receiving station knows that a DTMF signal was received and the DTMF signal is processed accordingly. If the confirmation packet is not detected, then the compressed packet in question is treated as a voice signal.

According to another embodiment of the present invention, a telephone signal to be transmitted over a computer data network is simultaneously compressed and analyzed for the presence of a DTMF signal. If a DTMF signal is detected, a confirmation packet comprising a code that represents the DTMF signal is produced. The code representing the DTMF signal and the compressed telephone voice signals are transmitted on separate virtual channels of the same logical channel to a receiver over a computer network.

At the receiver, the received signals on each virtual channel are split such that one channel is decompressed while packets on the other channel are analyzed for the presence of the code representing the DTMF signals. If no codes are detected, the decompressed telephone signals are applied to a receiving telephone. If a code representing a DTMF signal is detected, a corresponding DTMF signal is recreated and applied to the receiving telephone.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a method of reliably transmitting DTMF signals over a compressed data network such as a local area network (LAN) or a wide area network, like the Internet.

Figure 1:
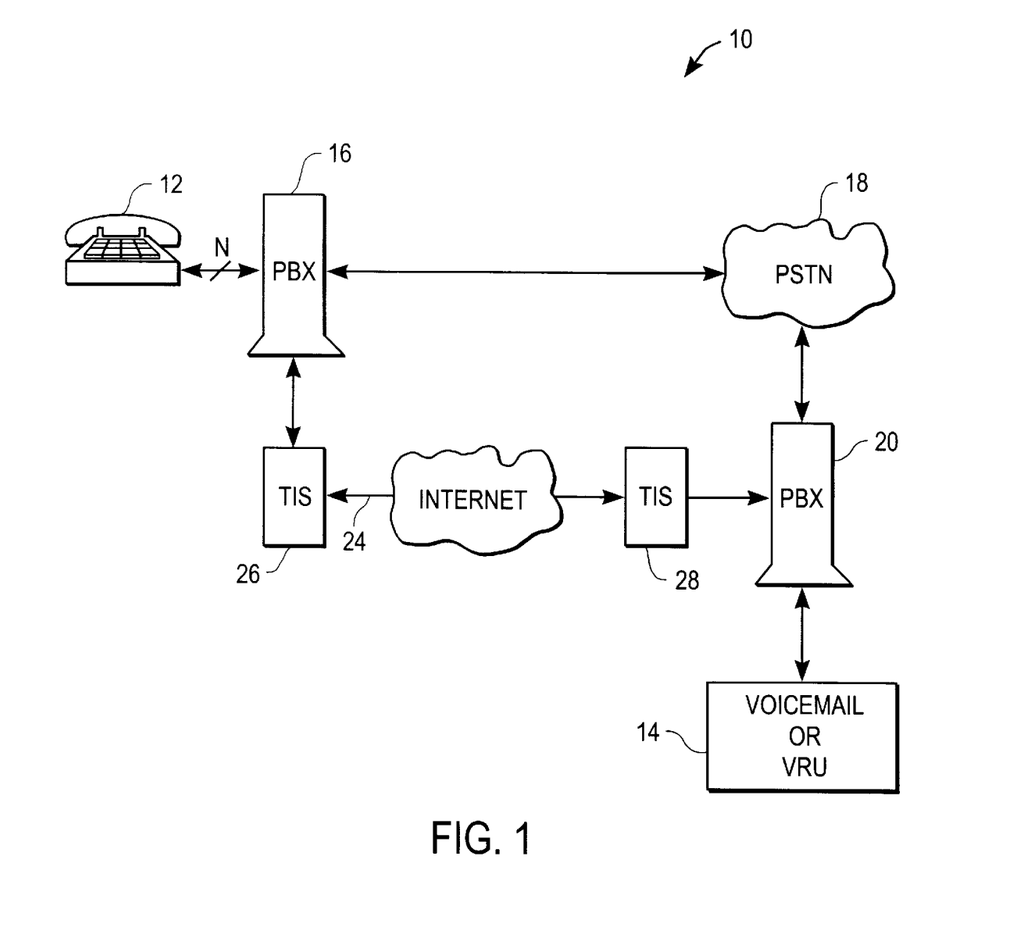
FIG. 1 is a block diagram of a communication system that transmits telephone signals on a compressed data network.

FIG. 1 illustrates a typical communication system 10 that carries a telephone call placed from one or more source telephones 12 to one or more destinations 14, which may comprise another telephone or computerized device such as a voice mail system or voice recognition unit. For systems that support many users, the source telephones 12 are generally connected to a private branch exchange (PBX) 16 that routes a call through a public switched telephone network (PSTN) 18. Also connected to the PSTN 18 is a private branch exchange 20 that is connected to one or more destination telephones, voice mail systems or voice recognition units 14.

As indicated above, a caller wishing to place a call from one of the source telephones to a destination is charged each time a telephone call is placed over the PSTN 18. In order to reduce the cost of communication services, it is possible to place the calls from a source to the destination on an alternate route. For example, telephone calls can be placed on a computer network 24 that is typically used to transmit computer data from one point to another. The computer network 24 is typically a LAN or wide area network such as the Internet. To transmit a telephone call on the computer network 24, the private branch exchanges 16 and 20 are each connected to a telephony Internet server 26 and 28, respectively. Telephone calls can be routed from the private branch exchange 16 through the telephony Internet server 26, where they are transmitted over the computer network 24 to arrive at the telephony Internet server 28 that is connected to the private branch exchange 20. The private branch exchange 20 then routes the telephone signals received to the destination telephone, voice mail system or voice recognition unit 14, thereby bypassing the public switched telephone network.

Telephone calls placed over the computer network 24 are not typically free because the communication lines that comprise the computer network 24 are generally leased. However, the excess capacity of these lines can be utilized without paying additional fees. Whether a telephone call is placed on the PSTN 18 or on the computer network 24, may be determined based on a variety of factors including the capacity of the computer network, the urgency of the call, the fidelity required, etc.

As described above, one of the problems associated with transmitting telephone signals over a computer network 24 such as the Internet, is the ability of a decoder to detect dual tone multi-frequency (DTMF) signals that are compressed and transmitted over such a network. In the example shown in FIG. 1, the telephony Internet server 28, that is associated with the destination of the telephone call, receives compressed data packets and decompresses them to recreate the original telephone signals. If a user presses a key on a keypad of the source telephone 12, the DTMF signal generated is digitized, packetized, and compressed by the telephony Internet server 26 before being transmitted over the computer network 24. Upon receipt, the de-compressed DTMF signal will not maintain its spectral purity so that a digital signal processor at the destination cannot determine whether the received packet is indeed representative of a DTMF signal. Therefore, in the past, users of a source telephone 12 have had difficulty controlling systems, such as a voice mail system or voice recognition unit, using DTMF signals when the call is routed over the compressed computer network 24.

Figure 2:
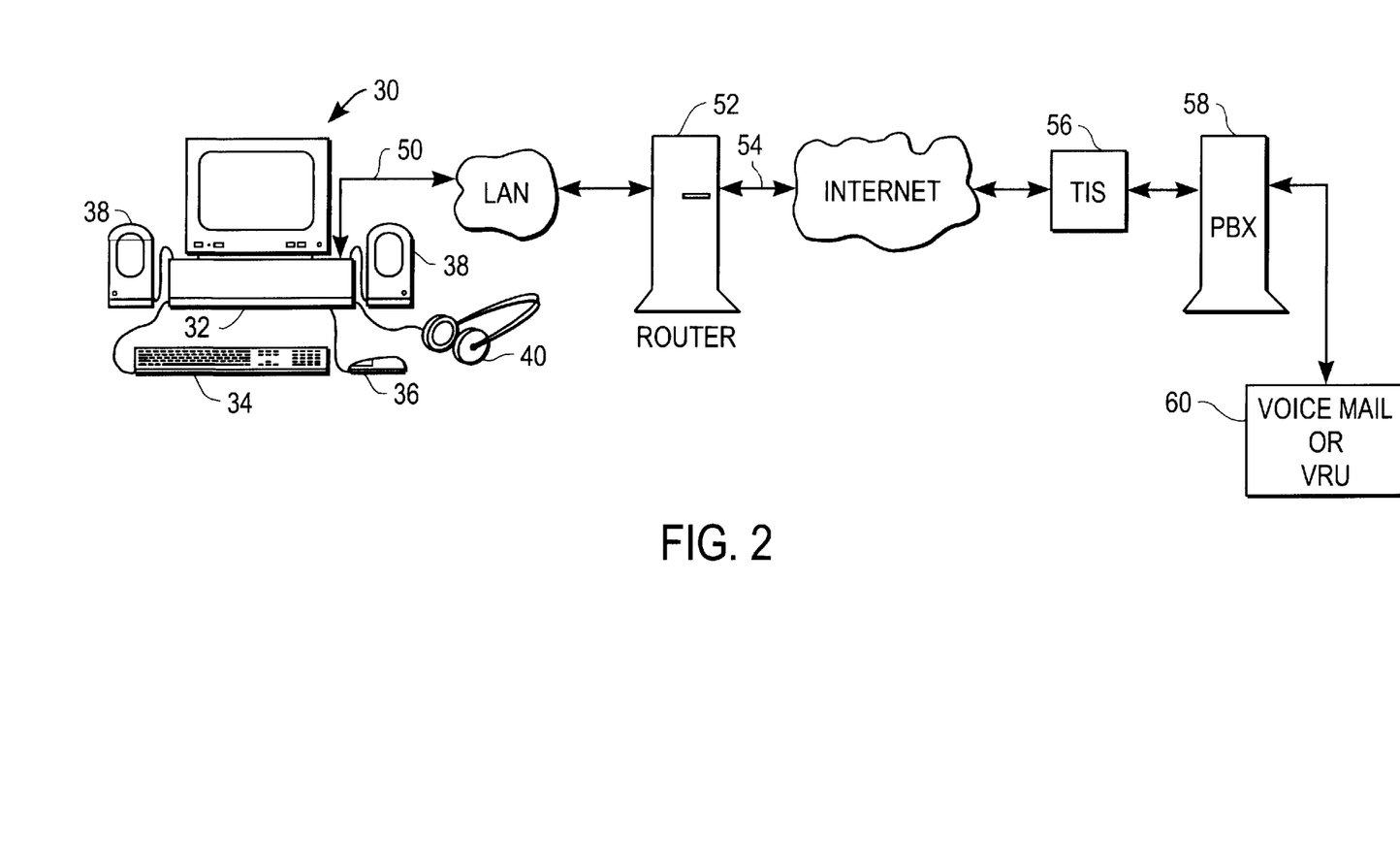
FIG. 2 is an alternative embodiment of a communication system that transmits telephone signals on a compressed data network.

FIG. 2 illustrates another communication system in which a telephone call is routed over a computer network. In this example, the source comprises a computer system 30 that includes a central processing unit 32, keyboard 34, pointing device such as a mouse 36, and speakers 38. Alternatively, the source may comprise an Internet Protocol telephone which is designed specifically for transmitting telephone signals over computer networks.

To generate the communication signals, the user speaks into a microphone or headset 40 that is connected to a sound card (not shown). DTMF signals are generated when the user presses the numbered keys on the keyboard 34. The voice signals received from the microphone 40 are digitized, packetized, compressed and transmitted on a local area network 50 by the central processing unit. If the call is to be transmitted over multiple LANs, or on a wide area network, the local area network 50 may be coupled to a router computer 52 that transmits the digitized, packetized and compressed telephone signals to another network such as the Internet 54.

At the destination, a telephony Internet server 56, which is also coupled to the Internet 54, receives the compressed telephone signals and decompresses them for supply to a private branch exchange 58. The private branch exchange is connected to a destination telephone, voice mail system or voice recognition unit 60 as described above. Again, the problem with the communication system shown in FIG. 2 is that the destination voice mail system, voice recognition unit, or PBX, has difficulty determining when touchtone signals are generated by the source computer system 30 due to the nature of the compression performed prior to transmission of the packets on the local area network 50 and Internet 54.

Figure 3:
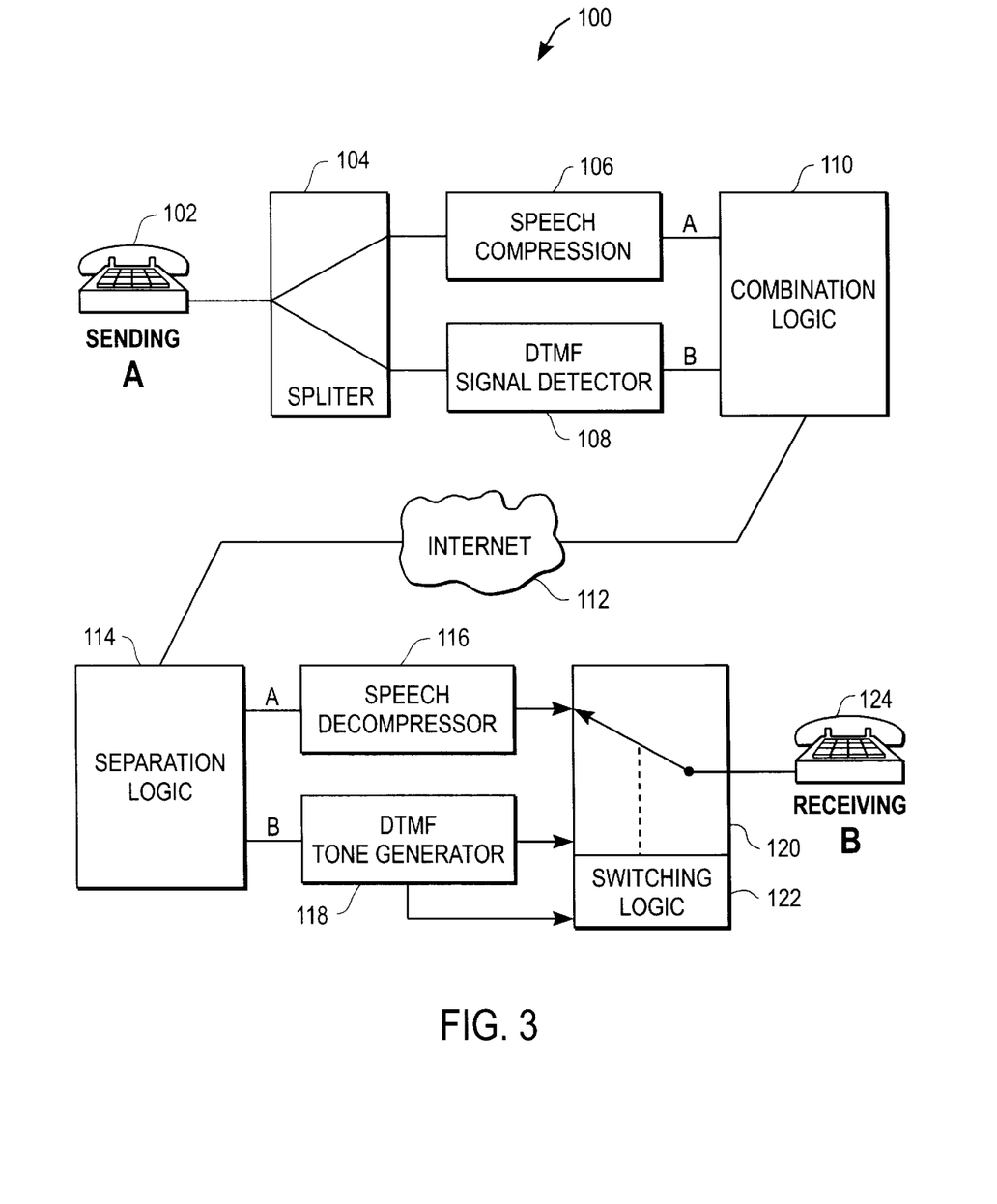
FIG. 3 is a block diagram of a system for transmitting DTMF telephone signals on a compressed data network according to the present invention.

FIG. 3 is a block diagram of a system for transmitting DTMF signals on a compressed voice network according to the present invention. The communication system 100 comprises a sending telephone or computer 102 that transmits telephone signals to a destination or receiving telephone system 124. The receiving telephone system 124 may be a conventional telephone used for voice communications or may comprise a voice recognition unit, integrated voice response unit or other computer that responds to DTMF signals.

To transmit telephone signals from the sending telephone 102 to the receiving telephone 124, signals from the sending telephone are applied to a splitter 104. The splitter 104 supplies the telephone signals to a pair of digital signal processors (DSP's) 106 and 108. The first digital signal processor 106 operates as a speech compressor and runs a speech compression algorithm that analyzes the telephone signals applied and compresses them according to techniques well known in the art. The second digital processor 108 operates as a DTMF signal detector and also receives the telephone signals produced by the sending telephone 102. The second digital signal processor 108 analyzes the telephone signals received for the presence of one or more DTMF signals. Upon detecting a DTMF signal, the digital signal processor 108 produces one or more codes that indicate to the receiving telephone that a DTMF signal is being transmitted. For example, in one embodiment of the invention, the second digital signal processor 108 generates a confirmation packet that comprises either a second compressed DTMF signal or a packet containing an uncompressed DTMF signal. The confirmation packet is transmitted immediately after the packet containing the compressed DTMF signal that is produced by the first digital signal processor 106. The original data packet containing the compressed DTMF signal and the confirmation packet are combined by a combination logic circuit 110 so that the two packets are transmitted on the same logical channel over the computer network to the destination telephone.

In an alternative embodiment of the invention, the second digital signal processor 108 produces a numeric code that represents the DTMF signal detected. For example, if a user presses the numeral 4 on their telephone keypad, the second digital signal processor 108 may produce one or more binary codes having a value of 004. However, any coding scheme that matches a code to a particular DTMF signal can be used. If no DTMF signal is detected by the second digital signal processor 108, then either no data or one or more null codes are produced.

The compressed voice signals produced by the first digital signal processor 106 and the codes produced by the second digital signal processor 108 are applied to the combination logic circuit 110 that inserts the data onto a logical channel for transmission on a computer network 112 such as the Internet. In the second embodiment of the invention, the combination logic circuit 110 places the compressed telephone signals and codes representing the DTMF signals produced by the digital signal processors 106 and 108 onto separate left and right virtual channels of a real time protocol (RTP) data stream.

At the destination, packets received from the computer network 112 are applied to a separation logic circuit 11 that supplies the data received from the computer network 112 to a pair of digital signal processors 116 and 118. The digital signal processor 116 operates as a speech decompressor and runs a speech decompression algorithm which converts the compressed speech received on the computer network 112 back to uncompressed speech. In addition, the speech decompression algorithm 116 attempts to decompress the DTMF signals that were compressed by the digital signal processor 106. However, because these codes do not represent compressed speech, the output of the digital signal processor 116 for these data packets will be meaningless.

When the compressed speech signals and the codes representative of the DTMF signals are transmitted on separate virtual channels, the digital signal processor 118 operates as a DTMF signal generator and analyzes each of the packets received on the other channel of the RTP data stream for codes that are indicative of a DTMF signal. Upon detection of such a code, the digital signal processor 118 recreates or synthesizes an appropriate DTMF signal for supply to the receiving telephone 124.

The outputs of the digital signal processors 116 and 118 are supplied to a switch 120. The switch is selectable between a first position wherein the output of the digital signal processor 116, comprising the decompressed speech, is applied to the receiving telephone 124. In the second position, the output of the digital signal processor 118, comprising the recreated DTMF signals, is supplied to the receiving telephone 124. The position of the switch is controlled by a switching logic circuit 122 that receives a signal from the digital signal processor 118. Upon the detection of a code indicative of a DTMF signal, the digital signal processor 118 signals the switching logic circuit 122 in order to change the position of the switch 120 such that the recreated DTMF signals are supplied to the receiving telephone 124. When the digital signal processor 118 no longer detects the codes indicative of a DTMF signal, the digital signal processor 118 signals the switching logic circuit 122 to move the position of the switch 120 such that the output of the decompressed speech produced by the digital signal processor 116 is applied to the receiving telephone 124.

If the system indicates the presence of a DTMF signal by sending a confirmation packet on the same channel as the voice data, the switch 120 remains connected to the output of the digital signal processor 116. The digital signal processor 116 analyzes each packet for the presence of a possible DTMF signal. If such a packet is received, the following packet is analyzed to confirm the presence of the DTMF signal. If no confirmation packet is received, the previous packet is treated as voice data.

The communication system 100 described above allows the transmission of DTMF signals without the use of additional uncompressed channels. In addition, because the data is transmitted on the same logical channel, synchronization between the speech and signaling is maintained without any increases in bandwidth required. Finally, the system can be made symmetrical whereby voice and DTMF signals produced by the telephone 124 for transmission to the telephone 102 can also be split and applied to speech compression and DTMF signal detecting digital signal processors before being transmitted on the computer network.

Figure 4:
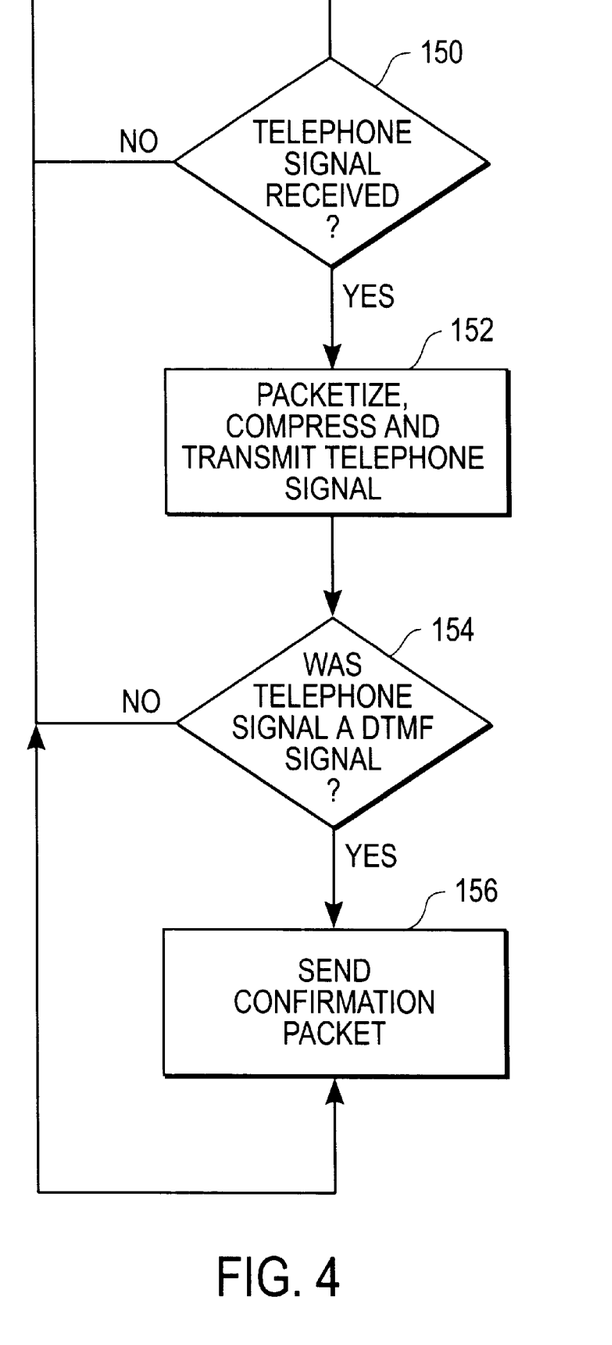
FIG. 4 is a flow chart of the steps performed by the present invention in order to transmit DTMF signals on a compressed data network.

FIG. 4 illustrates a series of steps performed by a telephony Internet server to transmit a DTMF signal on a compressed computer network. Beginning with a step 150, the telephony Internet server determines whether a stream of telephone signals (including voice and DTMF signals) is received. If not, processing returns to step 150 until such a stream of telephone signals is received. Assuming that a telephone signal is being received, the telephony Internet server packetizes, compresses and transmits the signals on the computer network at a step 152. At a step 154 the telephony Internet server determines whether a DTMF signal was received. This is typically performed using the digital signal processor 108 described above that continually analyzes the received telephone signals for a sinusoidal signal having a pair of predefined frequencies. If a DTMF signal is detected, a confirmation packet is transmitted at a step 156. As indicated above, the confirmation packet may comprise an additional compressed or uncompressed DTMF signal that is transmitted on the same logical channel immediately after the packet that contains the compressed DTMF signal. Alternatively, a code representing the DTMF signal can be sent on a separate virtual channel to the receiving telephony Internet server.

Figure 5A:
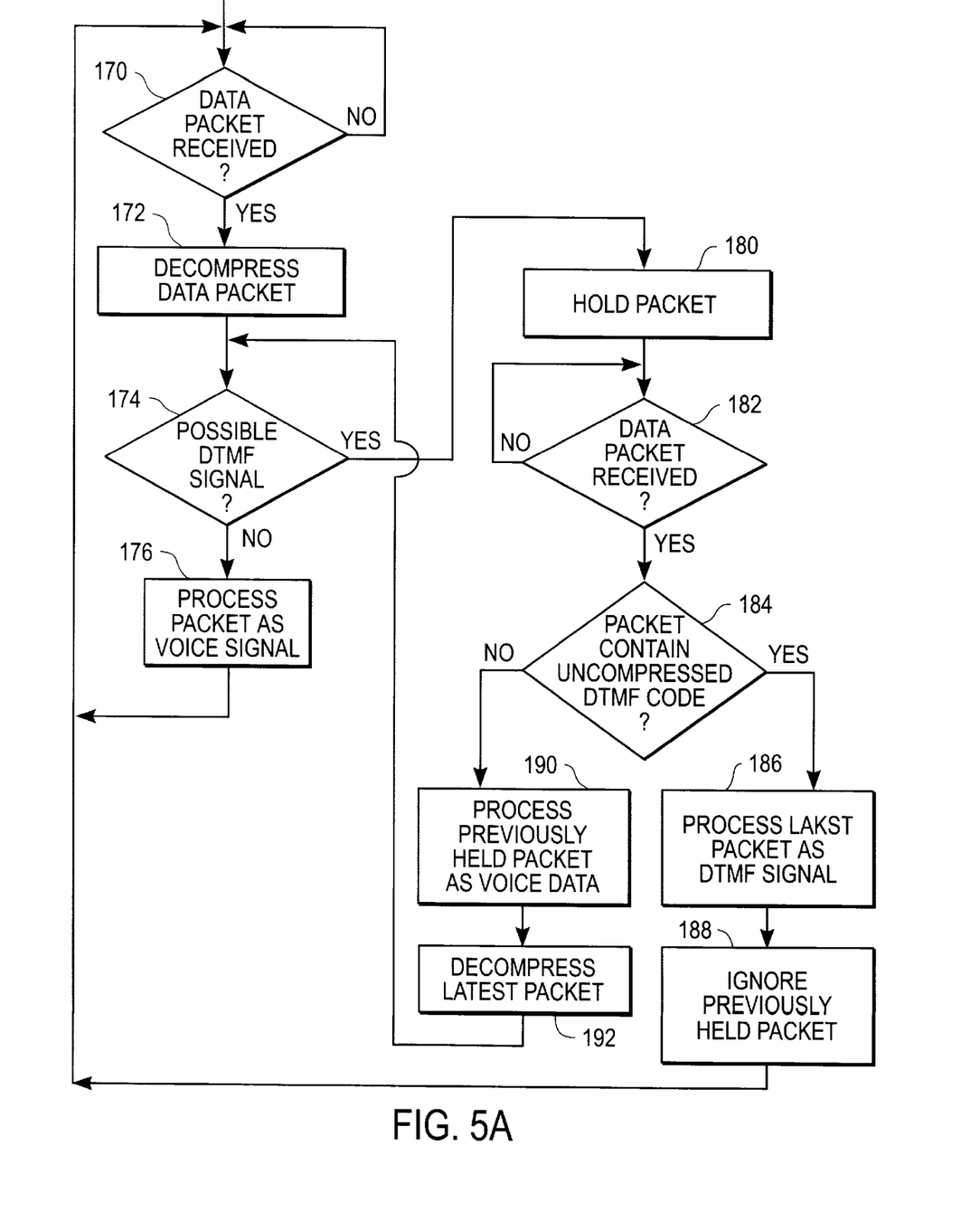
FIGS. 5A and 5B are flow charts of the steps performed by two alternative embodiments of the present invention in order to receive DTMF signals that are transmitted on a compressed data network.

FIG. 5A illustrates the series of steps performed by a telephony Internet server in order to accurately detect the transmission of a DTMF signal when a confirmation packet is transmitted on the same channel as the compressed voice data. - Beginning with a step 170, the telephony Internet server determines whether a data packet has been received from the computer network. If not, processing returns to step 170 until such a packet is received. Once a packet has been received, processing proceeds to a step 172, wherein the received packet is decompressed. At a step 174, a digital signal processor in the telephony Internet server determines whether the decompressed packet may represent a DTMF signal. If not, the received decompressed packet is processed as a conventional voice signal at a step 176.

Assuming the answer to step 174 is yes, and the received packet may represent a possible DTMF signal, the decompressed packet is held at a step 180 and the telephony Internet server begins looking for the confirmation packet to be transmitted.

Beginning at a step 182, the telephony Internet server waits for the next data packet to be received. Once the next data packet is received, processing proceeds to a step 184, wherein it is determined if the subsequent data packet received contains an uncompressed DTMF signal. If so, the latest packet is processed as a DTMF signal at a step 186, and the previously held packet is ignored at a step 188.

If the answer to step 184 is no and the subsequent packet does not contain an uncompressed DTMF signal, the packet that was held at step 180 is processed as a conventional voice signal at a step 190. The subsequent data packet is then decompressed at a step 192 and processing then returns to the step 174 to determine whether the subsequent packet may contain a possible compressed DTMF signal. The steps shown in FIG. 5A continue as long as packets of telephone signals are received from the compressed computer network.

Figure 5B:
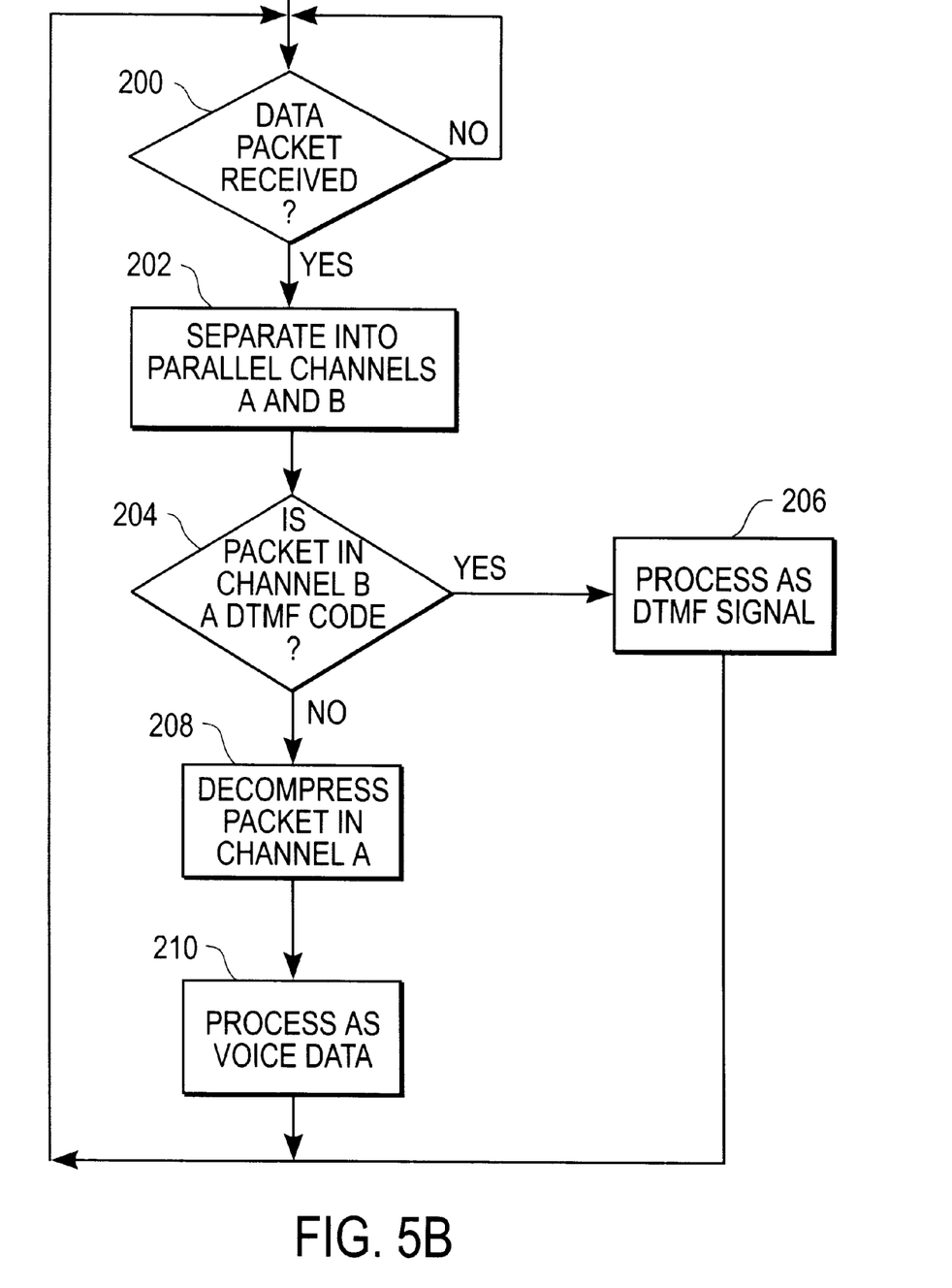

FIG. 5B illustrates the steps performed by the present invention when the voice packets and codes representative of DTMF signals are transmitted on separate virtual channels of the same logical channel. Beginning with a step 200, the receiving telephony Internet server determines if a data packet has been received. If so, processing proceeds to a step 202 where the packets on each virtual channel (referred to as channel A and channel B) are separated. At a step 204, the receiving telephony Internet server determines whether the packet received on the virtual channel B is representative of a DTMF signal. If so, the packet is treated as a DTMF signal. If the answer to step 204 is no, then the packet received on virtual channel A is decompressed at a step 208 and processed as voice data at a step 210.

As can be seen from the above, the present invention allows systems such as voice mail systems or voice recognition units that are operated by DTMF signals to be accessed from computer networks that carry compressed data. As such, voice mail systems or voice recognition units can be accessed from local area or wide area networks such as the Internet.

The embodiments of the invention in which an exclusive property or privilege is claimed are defined as follows:

1. A method of communicating DTMF signals on a computer network, comprising:

receiving a telephone signal including voice signals and DTMF signals;

simultaneously compressing the received telephone signal, which includes a DTMF signal, and analyzing the received telephone signal for the presence of the DTMF signal;

generating one or more codes representing the DTMF signal if a DTMF signal is detected; and transmitting the compressed telephone signal, which includes a compressed DTMF signal, and the one or more codes representing the DTMF signal on the computer network, the computer network including a telephony Internet server.

2. The method of claim 1, wherein the step of transmitting the compressed telephone signal and the one or more codes representing the DTMF signal are sent on the same logical channel.

3. The method of claim 1, wherein the step of transmitting the compressed telephone signal and the one or more codes representing the DTMF signal, comprises:

transmitting the compressed telephone signal on a first virtual channel of a multichannel real time protocol data stream; and transmitting the one or more codes representing the DTMF signal on a second virtual channel of a multichannel real time protocol data stream.

4. The method of claim 1, further comprising the steps of:

receiving the compressed telephone signals and the one or more codes representing the DTMF signal from the computer network;

simultaneously decompressing the compressed telephone signals and detecting whether one or more codes representing DTMF signals have been received from the computer network;

generating DTMF signals if one or more codes representing the DTMF signals are received; and supplying either the decompressed telephone signals or the generated DTMF signals to a receiver.

5. The method of claim 4, wherein the step of supplying either the decompressed telephone signals or the generated DTMF signals to a receiver comprises the steps of:

supplying the decompressed telephone signals to the receiver if the one or more codes representing the DTMF signals are not detected; or supplying the generated DTMF signals to a receiver if one or more codes representing the DTMF signals are detected.

* * * * *